United States Patent [19]
Huang

[11] Patent Number: 5,871,227
[45] Date of Patent: Feb. 16, 1999

[54] FOLDABLE MECHANISM FOR USE IN A STROLLER

[76] Inventor: Li-chu Chen Huang, No. 99, Fuchou 7th St., Chiayi City, Taiwan

[21] Appl. No.: 730,349

[22] Filed: Oct. 15, 1996

[51] Int. Cl.[6] .................................................. B62B 1/00
[52] U.S. Cl. ........................ 280/642; 280/650; 280/658; 403/93; 403/327
[58] Field of Search ..................... 280/642, 650, 280/47.4, 658, 643, 647, 657; 403/93, 315, 316, 325, 327

[56] References Cited

U.S. PATENT DOCUMENTS

| | | | |
|---|---|---|---|
| 4,632,421 | 12/1986 | Shamie | 280/642 |
| 4,907,818 | 3/1990 | Chai | 280/642 |
| 5,205,577 | 4/1993 | Liu | 280/642 |
| 5,244,228 | 9/1993 | Chiu | 280/642 |
| 5,257,799 | 11/1993 | Cone et al. | 280/642 |
| 5,460,398 | 10/1995 | Huang | 280/642 |
| 5,605,409 | 2/1997 | Haut et al. | 280/650 X |
| 5,645,293 | 7/1997 | Cheng | 280/642 |
| 5,755,455 | 5/1998 | Chen et al. | 280/642 |

*Primary Examiner*—Robert J. Oberleitner
*Assistant Examiner*—Pamela J. Lipka
*Attorney, Agent, or Firm*—Kolisch Hartwell Dickinson McCormack & Heuser

[57] ABSTRACT

A foldable mechanism for use in a stroller enables a user to fold the stroller by only a single foot while both of the user's hands are not available. In addition, the user is also able to fold the stroller by a single hand with a switch mounted on a handle of the stroller through a traction element which is securely connected to a retainer of the foldable mechanism, thus while either the switch or the foldable mechanism is being operated by the user, the other one will also be moved because the traction element is connected therebetween.

3 Claims, 11 Drawing Sheets

FOLDABLE MECHANISM FOR USE IN A STROLLER

FIELD OF THE INVENTION

The present invention generally relates to a foldable mechanism, and more particularly to a mechanism which is able to be folded by a single hand or a single foot.

BACKGROUND OF THE INVENTION

Strollers having a braking system for parking safely, wheels for steering, and foldable means for storage have been widely used all over the world. By means of the above mentioned improved devices, a stroller provides a comfortable and safe environment to a baby when a user is taking his/her baby out for a walk in a stroller.

On some occasions, it is almost impossible for parents to fold the stroller while his/her arms are busy holding a baby or groceries. Therefore, a stroller having a foldable means mounted thereon for a user to fold it with both arms will not satisfy the user on some occasions especially when both arms are not available.

From the previous description, it is noted that especially when both arms are not available or even one arm is left to fold the stroller, a general stroller with a folding mechanism which needs both hands of a user to operate the folding mechanism will not meet the requirement of practical needs or the standard of safety.

Thus, a stroller constructed in accordance with the present invention tends to mitigate and/or obviate the aforementioned problems.

SUMMARY OF THE INVENTION

The main objective of the invention is to provide a foldable mechanism for use in a stroller. The foldable mechanism includes a locking member having a notch integrally formed therewith, and a link member detachably connected with the locking member for moving a back support and a middle support which are pivotally connected therewith. A transverse bar is designed between two foldable mechanisms, so that if a user only operates the bar, both sides of the stroller will respond to the operation, which means that if both arms of a user are not available to fold the stroller, then he/she is still able to fold the stroller by using a single foot to operate the transverse bar without any help.

Another objective of the invention is to provide a stroller having a safety switch mounted thereon for folding the stroller by using a traction element securely connected between the safe and the locking member, such that the user will have alternative options when intending to fold the stroller.

Still another objective of the invention is to provide a retaining member which is pivotally connected with the middle support. The retaining member has a recess configured to mate with a protrusion formed on one side of the locking member, such that a third party will not easily cause an unexpected folding of the stroller while the baby is resting within the stroller if the retaining member is securely connected with the protrusion of the locking member after the locking member securely engages with the link member.

Other objects, advantages and novel features of the invention will become more apparent from the following detailed description when taken in conjunction with the accompanying drawings.

BRIEF DESCRIPTION OF THE DRAWINGS

The present invention will now be better understood with reference to the following drawings, wherein.

DETAILED DESCRIPTION OF THE PREFERRED EMBODIMENT

Figure 1:
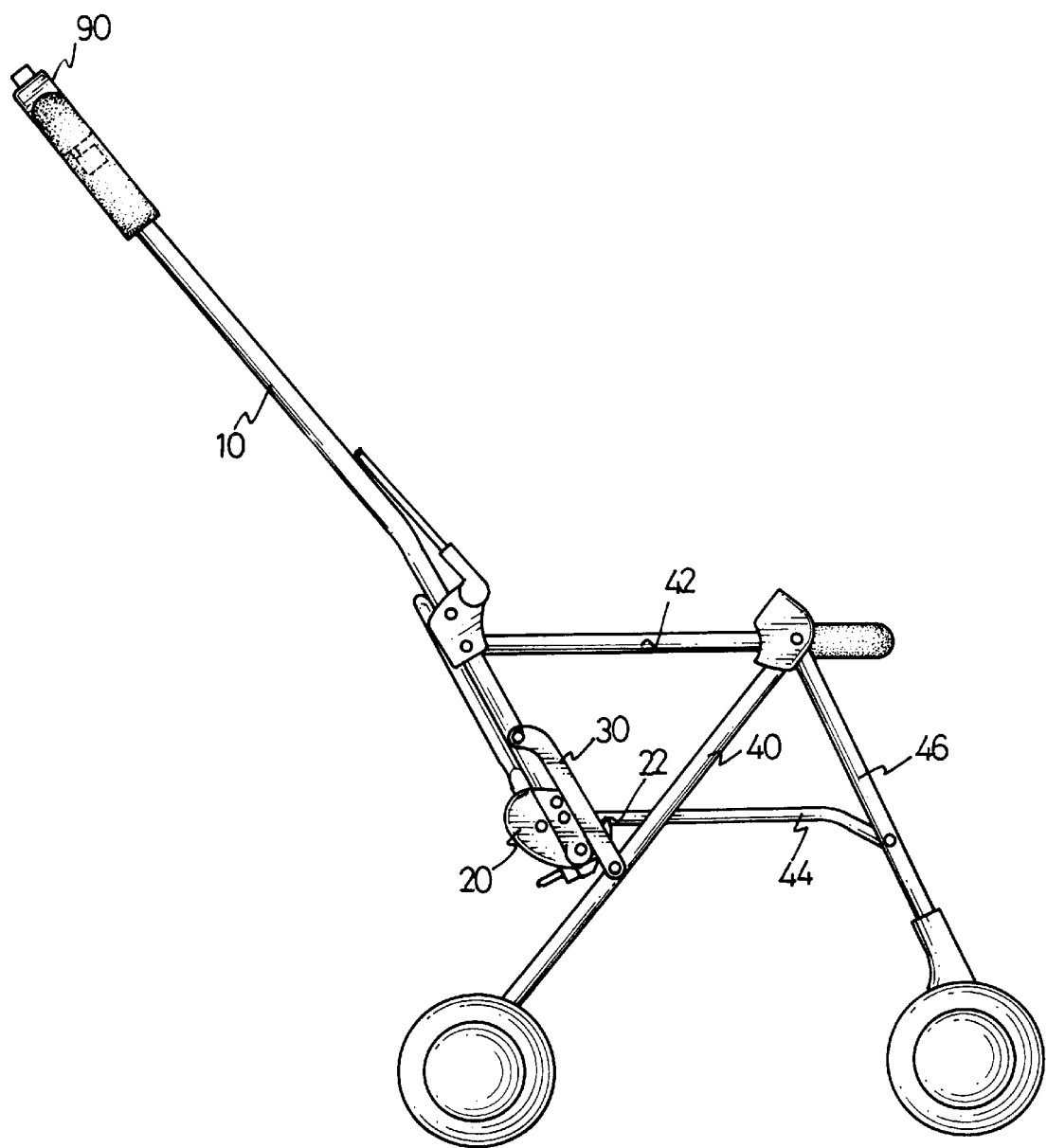
FIG. 1 is a side view of a stroller constructed in accordance with the present invention.

Referring to FIG. 1, a stroller constructed in accordance with the present invention is shown. The stroller includes a handle 10, a supporting rod 48 pivotally connected with the handle 10, a bottom support 44 pivotally connected with the supporting rod 48 and a front support 46 which is pivotally connected with a frame 42 and a middle support 40 and the middle support 40 and the frame are also pivotally connected with each other. A distal end of each of the front support 46 has a respective one of four wheels 60 rotatably attached thereto and the middle support 40, therefore, the stroller is able to be pushed along. It is noted that a foldable mechanism 20 having a retainer 22 is equipped between the supporting rod 48 and the bottom support 44, with which the stroller of the present invention is able to be folded by way of a switch 90 securely connected on the handle 10.

Figure 2:
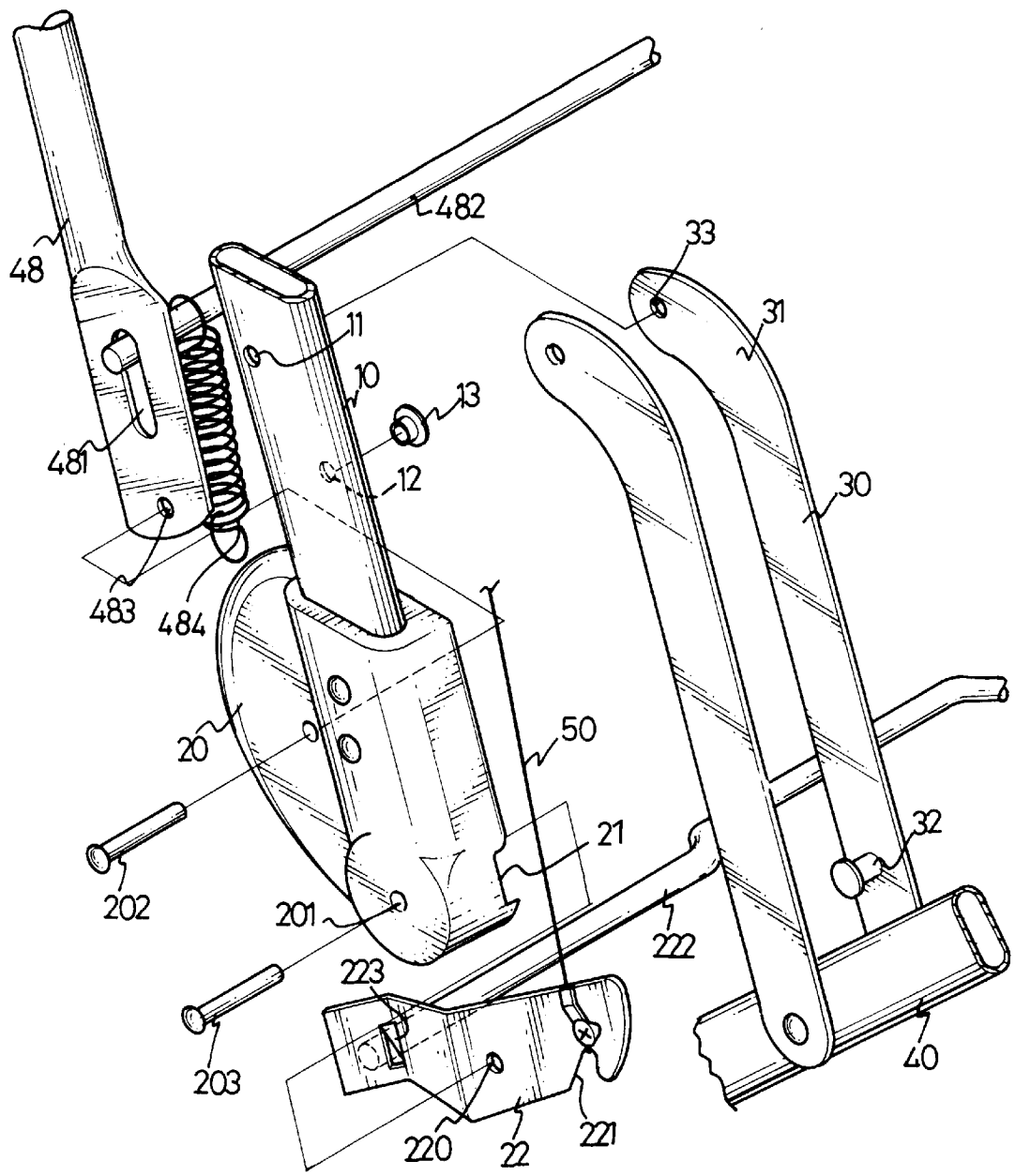
FIG. 2 is an exploded view of a foldable mechanism incorporated with a link member.

FIG. 2 shows that the foldable mechanism 20 includes a connecting member 21 securely connected with the handle 10, a retainer 22 having a notch 221 defined therein and pivotally connected with the connecting member 21, a transverse bar 222 securely connected with the retainer 22, a link member 30 having a protrusion 32 formed thereon and a pair of horizontally disposed plates 31 each having a hole 33 defined on a distal end thereof for aligning with a through hole 11 of the handle 10 and pivotally connected between the handle 10 and the middle support 40, a coil spring 484 having a first end (not numbered) securely connected with a catch 223 formed on a side face of the retainer 22 and a second end (not numbered) securely connected with an adjusting rod 482 which is received within a long slot 481 defined in a supporting rod 48. The supporting rod 48 is securely connected with the handle 10 by means of a sleeve 13 inserting into aligned first bore 483 of the supporting rod 48 with a second bore 12 of the handle 10.

Figure 3:
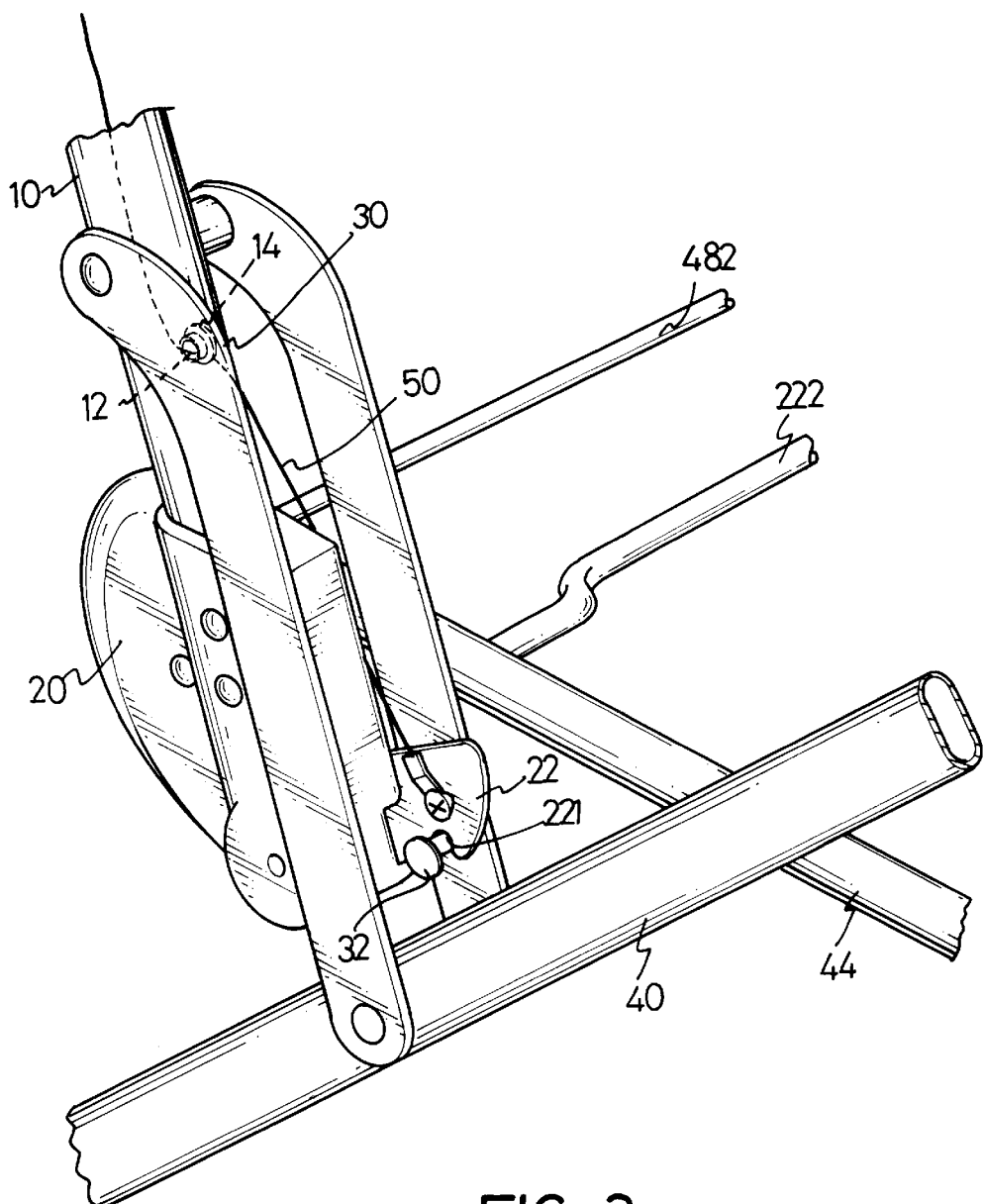
FIG. 3 is a partial perspective view of the stroller showing that the locking member is securely connected with the link member and that a transverse bar is connected with one end of the locking member.

Referring to FIG. 3, after all the above mentioned components are assembled, the protrusion 32 of the link member 30 fits in the notch 221 of the retainer 22 and a distal tip of a traction element 50 is then securely connected to the retainer 22, such that the retainer 22 is able to be controlled by the traction element 50. The figure also shows that due to the pivotal connection between the middle support 40 and the handle 10 through the link member 30, if the protrusion 32 of the link member 30 is moved from the notch 221 of the retainer 22, the handle 10 and the middle support 40 are able to be moved relatively toward each other.

Figure 4:
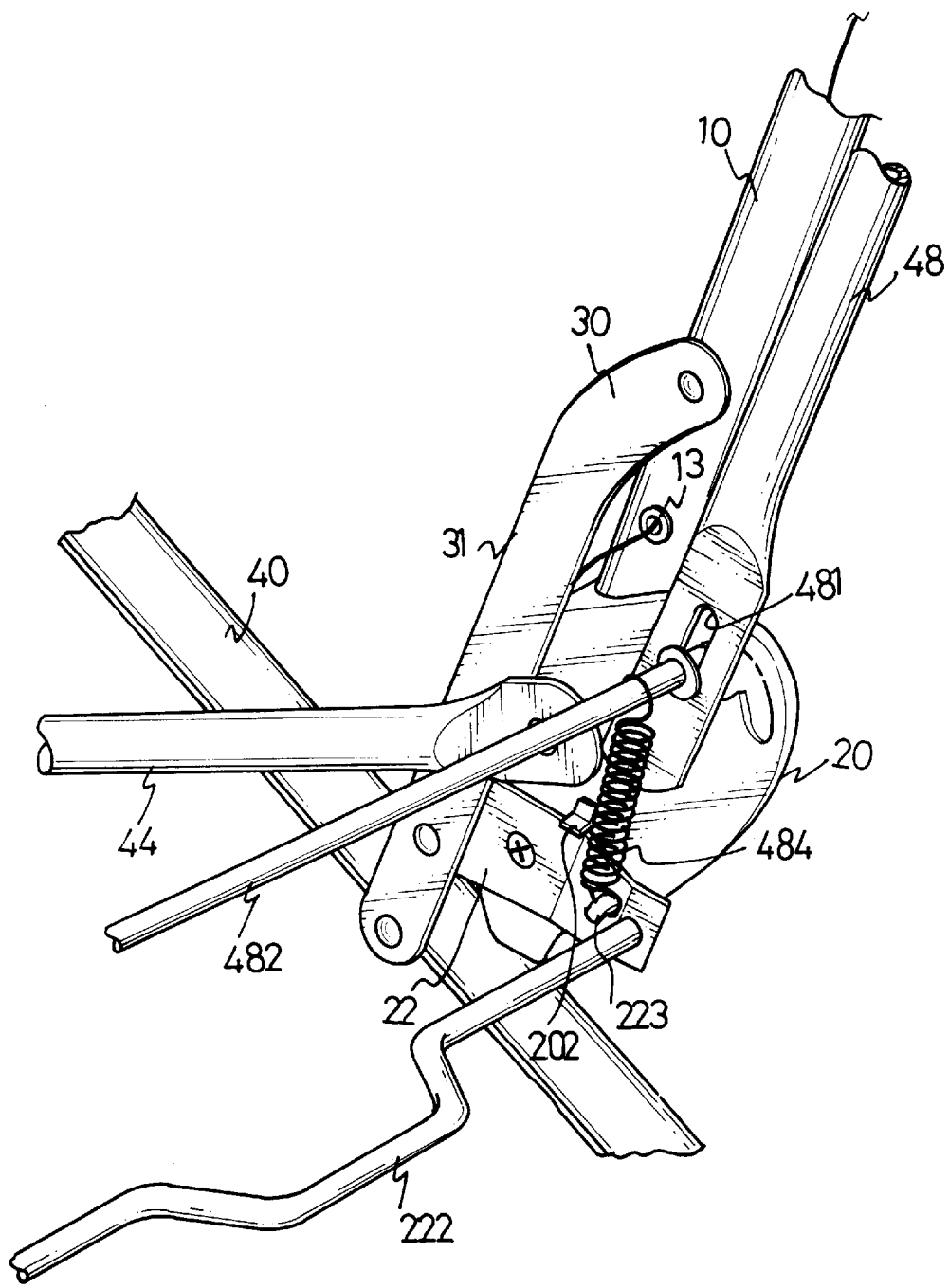
FIG. 4 also a partial perspective view of the stroller showing a structural configuration of the locking member with the link member.

It is clearly shown in FIG. 4 that the coil spring 484 is securely connected between the adjusting rod 482 received within the long slot 481 of the supporting rod 48 and the catch 223 of the retainer 22, so that when an external force is exerting on the transverse bar 222, the coil spring 484 will provide a recoil force to the transverse bar 222 to recover to its original position. A stop 202 integrally formed on the connecting member 21 is to limit the moving of the retainer 22, such that the coil spring 484 will keep in the best working condition relative to the retainer 22. The adjusting rod 482 which is received within the long slot 481 of the supporting rod 48 functions to adjust a seating angle of a baby within the stroller, and since it is well known in the art, it is not necessary to be described in any detail.

Figure 5:
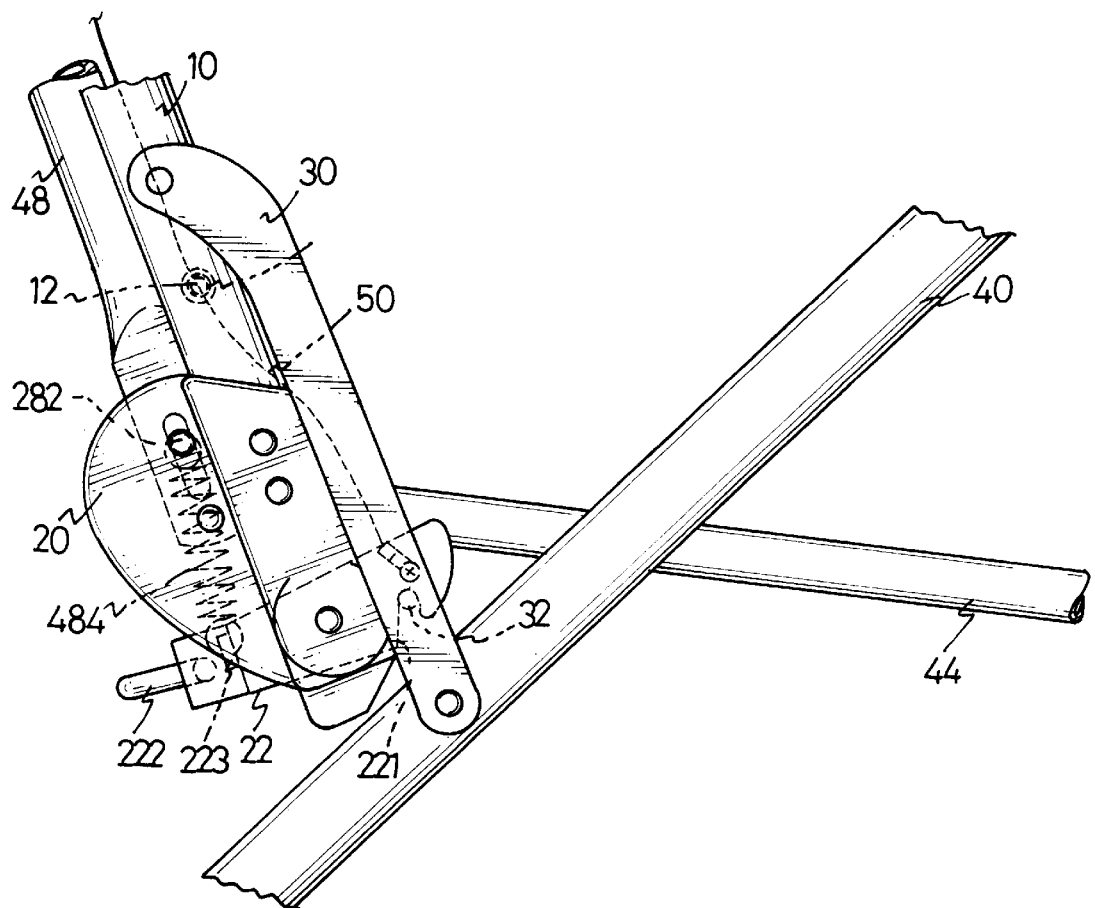
FIG. 5 is a side view showing how a coil spring is securely connected with the locking member to provide a recoil force to the locking member after an external force is exerted thereon.

Referring to FIG. 5, the traction element 50 is inserted into the second bore 12 of the handle 10 after the sleeve 13 is also inserted therein, then the traction element 50 is secured on the retainer 22. In this embodiment, the first end of the coil spring 484 is hung on the adjusting rod 482 and the second end of the coil spring 484 is securely engaged with the catch 223 of the retainer 22. Furthermore, the transverse bar 222 having two ends each are connected fixedly with an end of the retainer 22. The retainer 22 is pivoted to the connecting member 21 by aligning a first hole 220 defined in the retainer 22 with a second hole 201 defined in the connecting member 21 and riveting a first pin 203 therethrough. After assembly, the retainer 22 pivots about the first pin 203 under the control of the transverse bar 222.

Figure 6:
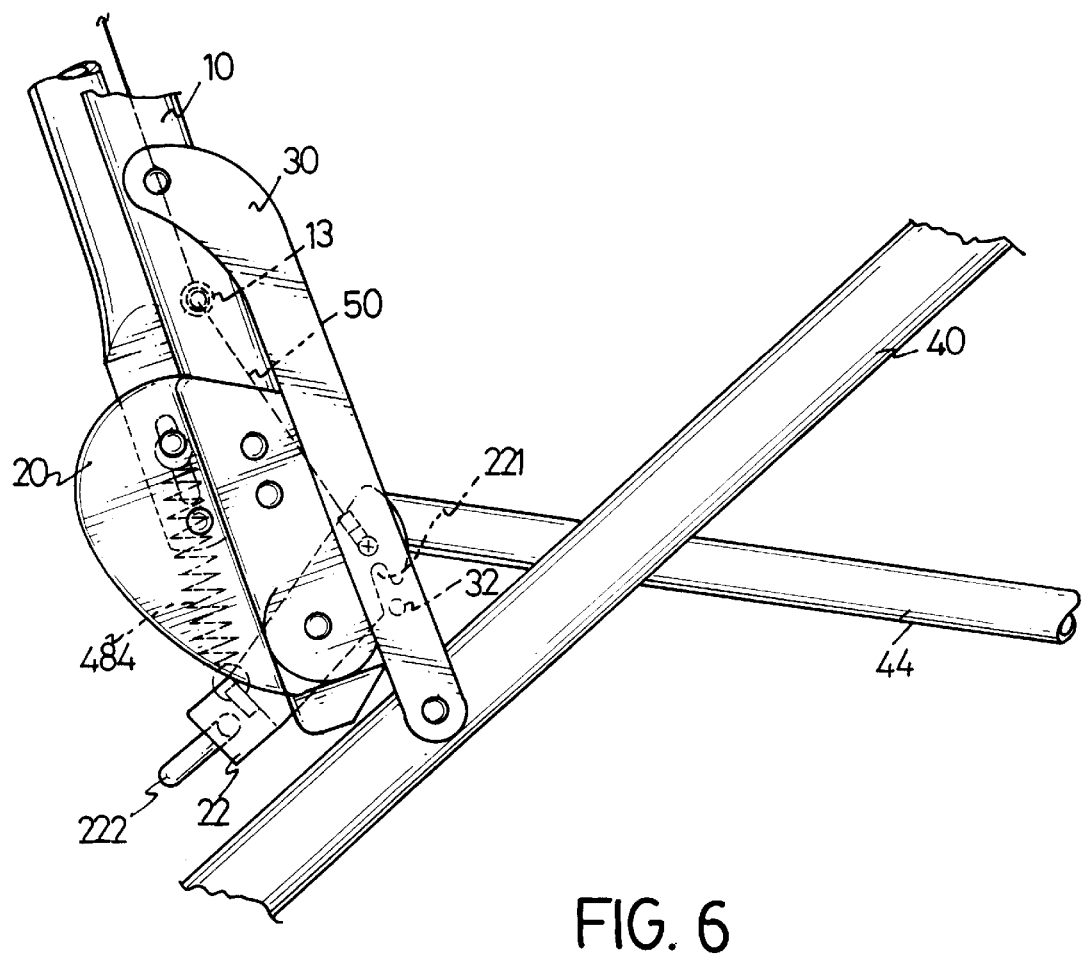
FIG. 6 is also a side view showing how the locking member is moved away from the protrusion of the link member.
Figure 7:
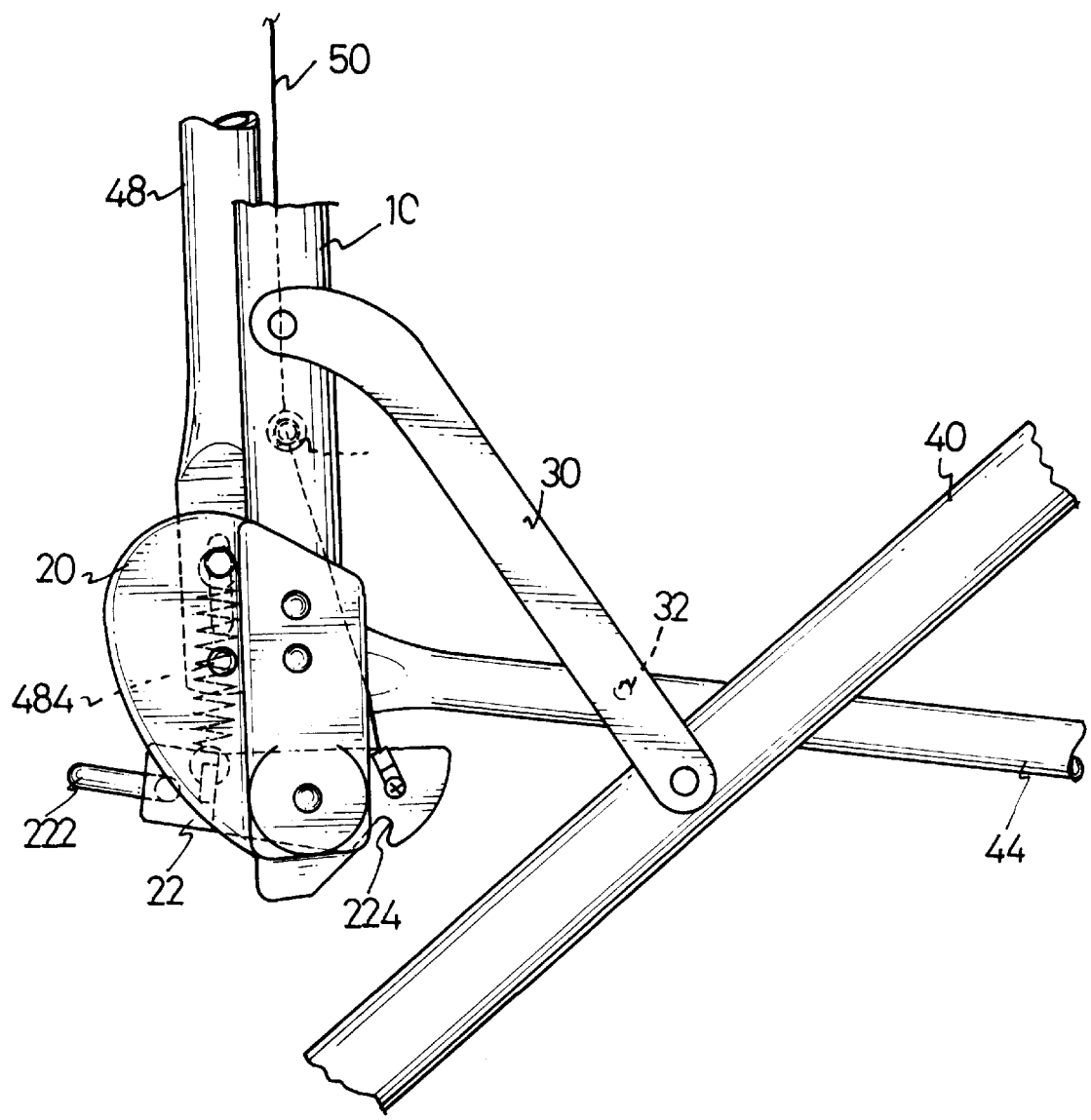
FIG. 7 is another side view showing how the locking member is completely moved away from the protrusion and that the stroller is able to be folded.

Referring to FIGS. 6 and 7, while the retainer 22 is tracked by the traction element 50 or by an external force exerted thereon, the retainer 22 is moved upwardly to leave the limitation of the protrusion 32 of one of the plates 31, so that, due to the pivotal connection between the handle 10 and the middle support 40 by means of the link member 30, the middle support 40 and the handle 10 will be moved closer and closer as the folding force remains.

Figure 8:
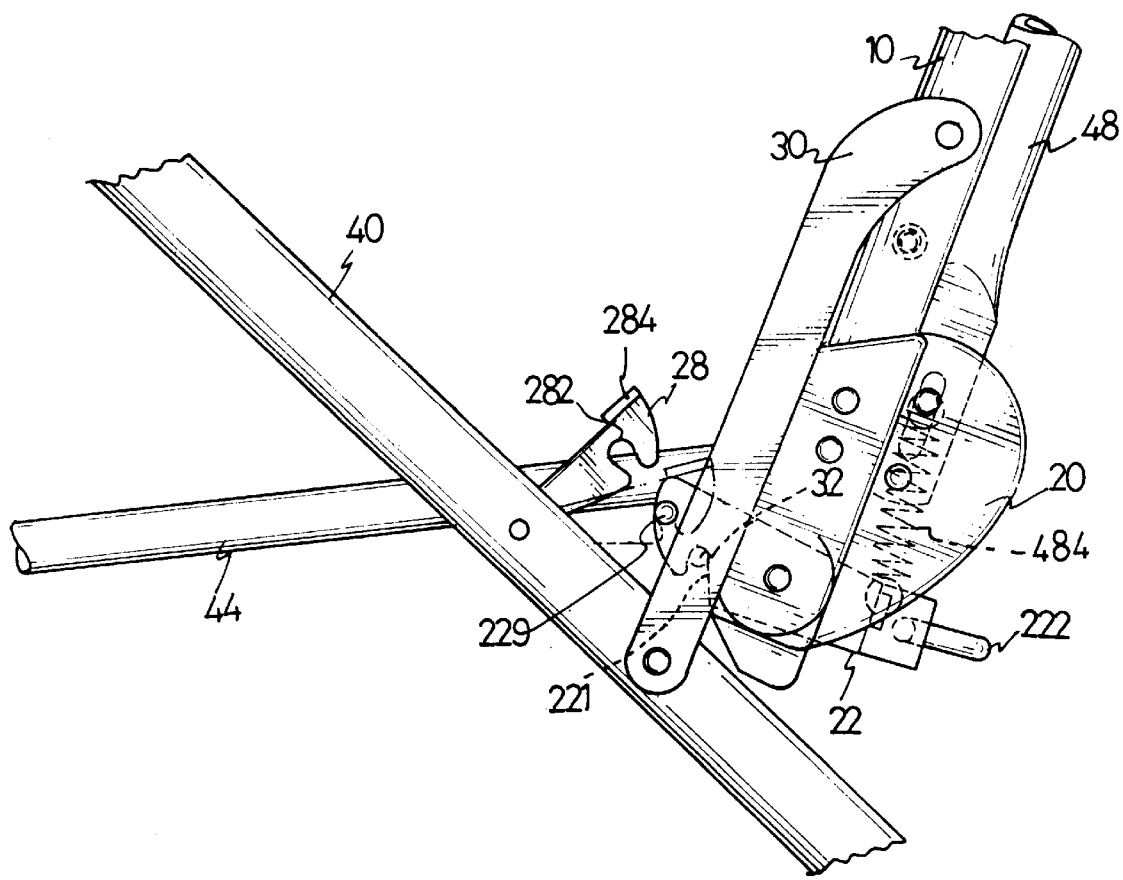
FIG. 8 is further a side view showing a corresponding side of the structural configuration of the locking member and the link member when a retaining member pivotally connected with the middle support is ready to secure the locking member.

Referring to FIG. 8, a safety catch 28 pivotally connected with the middle support 40 is further designed to ensure safety of the combination of the stroller. When the protrusion 32 of the link member 30 fits in the notch 221 of the retainer 22, the stroller of the invention is ready to be pushed along by the user. Yet, the folding of the stroller is operable both by the switch 90 and the transverse bar 222, care is needed not to touch the switch 90 or the transverse bar 222, in case a sudden folding of the stroller may occur while either the switch 90 or the transverse bar 222 is touched. Therefore, the safety catch 28 having a recess 282 aligned with the notch 221 of the retainer 22 and fitted snugly with the protrusion 32 of the link member 30 and a wing 284 integrally and perpendicularly formed therewith is provided to prevent such an accident from occurring.

As previously described, one end of the traction element 50 is securely connected to the retainer 22 to readily control the retainer 22 when the stroller is about to be folded, the other end of the traction element 50 is securely connected to a switch 90 mounted on the handle 10 to control both sides of the stroller, thereby the user will be able to very easily fold the stroller by only controlling the switch 90, which links both retainers 22 on each side of the stroller through the traction element 50. Thus, the user will have no trouble folding the stroller by using the switch 90. Therefore, the structure of the switch 90 will now be described in the following.

Figure 9:
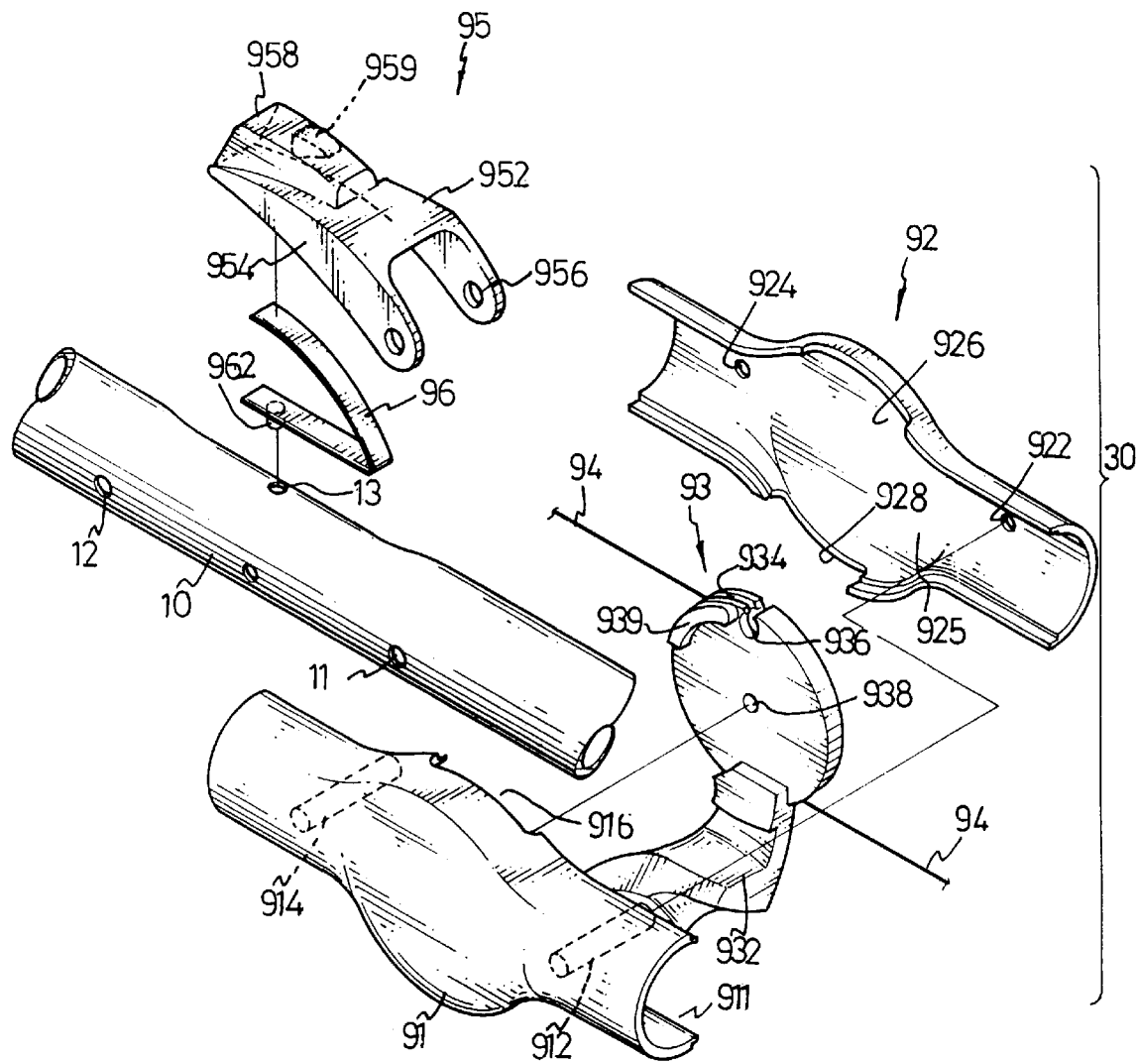
FIG. 9 is an exploded view of a switch.
Figure 10:
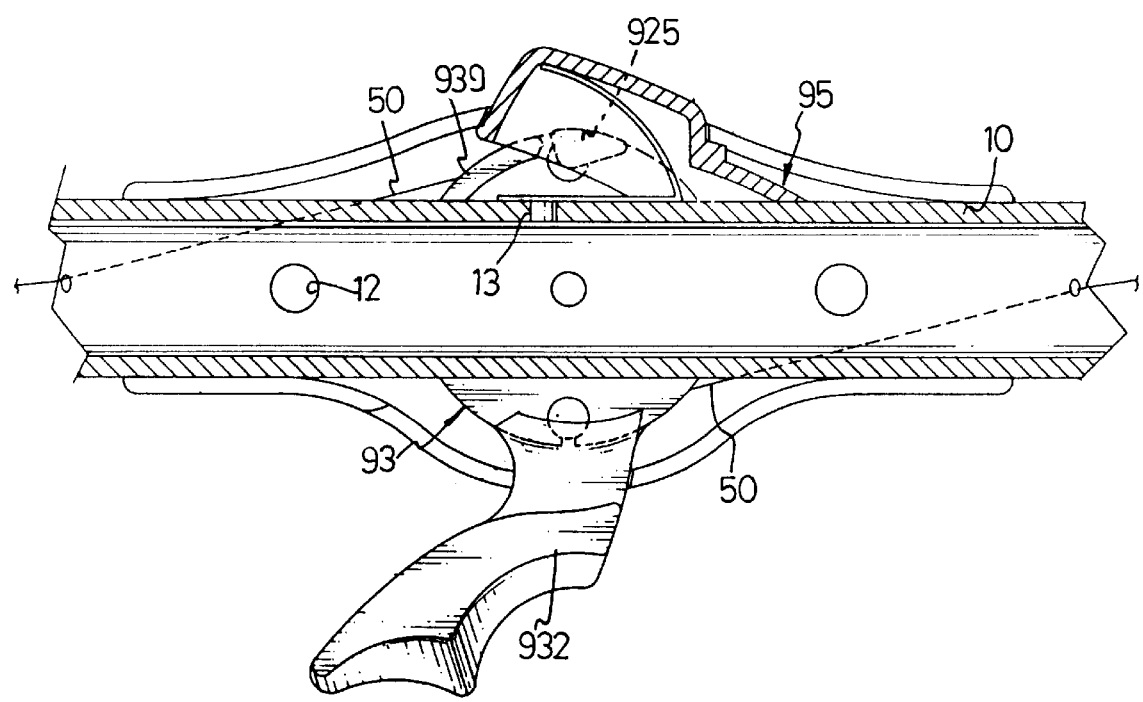
FIG. 10 is a sectional view of the switch showing related members within the switch after combination.

Referring to FIG. 1 and further to FIGS. 8 and 9, the switch 90 includes a front cover 91 and a rear cover 92 sized and configured to extend around a central portion of the handle 10. It is to be noted that the front cover 91 is disportionately greater than the rear cover 92 such that the front cover 91 extends over a greater part of a circumference of the handle 10. A compartment 925 is defined between the rear cover 92 and the handle 10. A first peg 912 and a second peg 914 are spaced apart and extend integrally and perpendicularly from an inner face of the front cover 91. A first pair of aligned transverse holes 11 corresponding to the first peg 912 is defined in the central portion of the handle 10. A second pair of aligned transverse holes 12 corresponding to the second peg 914 is defined in the central portion of the handle 10. A first hole 922 and a second hole 924 also corresponding to the first and second pegs 912, 914 are defined in the rear cover 92. A first cutout 916 is defined in a top of the front cover 91 and a second cutout, 926 corresponding to the first cutout 916 is defined in a top of the rear cover 92 such that when the front and the rear covers 91, 92 are combined to enclose the central portion of the handle 10, an opening is thereby defined. A first arcuate slot 928 is defined in a bottom of the rear cover 92.

A disk 93 comprises a lever 932 extending from a circumferential periphery thereof, two diametrically opposed circumferential grooves 934, each terminating in a transverse socket 936, and a central bore 938. An arcuate flange 939 is formed at an upper portion of a first side of the disk 93. A pin (not shown) pivotally secures the disk 93 to a side of the central portion of the handle 10, such that the first side of the disk 93 is adjacent to the handle 10. The disk 93 is received in the compartment 925 between the handle 10 and the rear cover 92. The lever 932 extends through the first arcuate slot 928 of the rear cover 92.

A latch 95 is substantially "U" shaped and has a middle portion 952 from which two spaced-apart arcuate limbs 954 downwardly extend, each limb 954 defining a pivot hole 956 near a distal tip thereof. The middle portion 952 of the latch 95 has formed on a top surface thereof a button 958 sized and configured to extend through the opening defined by the front and rear covers 91, 92. The arcuate limbs 954 of the latch 95 define a distance therebetween such that the diameter of the handle 10 may be received therein whereby the first peg 912 of the front cover 91 is extended through one of the pivot holes 956, the first pair of transverse holes 11, the remaining pivot hole 956 and the first hole 922 of the rear cover 92. The second peg 914 extends through the second pair of transverse holes 12 and the second hole 924 of the rear cover 92. Distal tips of the first peg 912 and the second peg 914 can be deformed, e.g., by heat, after they have projected through the rear cover 92 such that the front cover 91, the rear cover 92, the disk 93 and the latch 95 can be securely assembled together.

Figure 11:
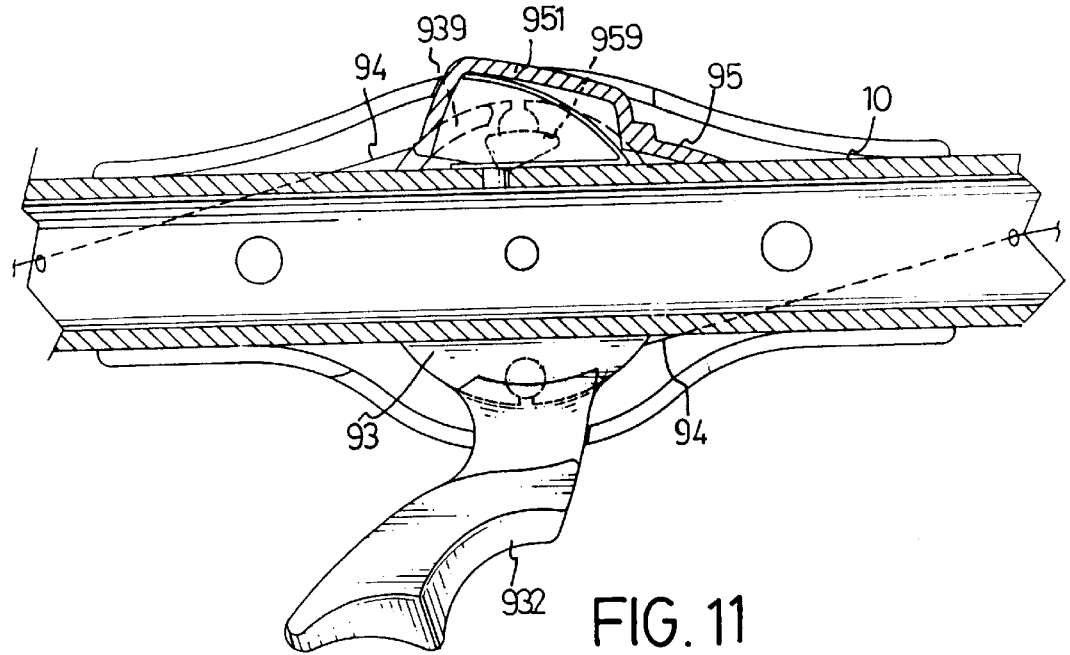
FIG. 11 is a schematic view of the switch showing the relative movement of a disc provided with a pair of steel wires corresponding to the movement of a trigger.

A resilient member 96, for example, a leaf spring, has a flat element and an arcuate element integrally extending upwardly from one end thereof, and a location lug 962 extending downwardly from a bottom face of the flat element. The resilient member 96 is disposed between a top of the central portion of the handle 10 and an underside of the middle portion 952 of the latch 95 with the location lug 962 being securely retained in a top hole 13 defined in the top of the central portion of the handle 10. Whereby, the resilient member 96 urges upwardly the latch 95 so that the button 958 projects reciprocatingly through the opening. Furthermore, an inner face of one of the arcuate limbs 954 has perpendicularly formed thereon a stop 959 sized and disposed to abut the arcuate flange 939 when the latch 95 is in a non-depressed condition as shown in FIG. 11, whereby the switch 90 is in an engaged state. A pair of cables 94 each have a first end with a nipple 942 fixed thereto. The nipples (not shown) are sized and configured to be received in respective sockets 936 of the disk 93 whereby the cables 94 are received in the corresponding circumferential grooves 934 and further extend in opposite directions inside the handle 10.

Figure 12:
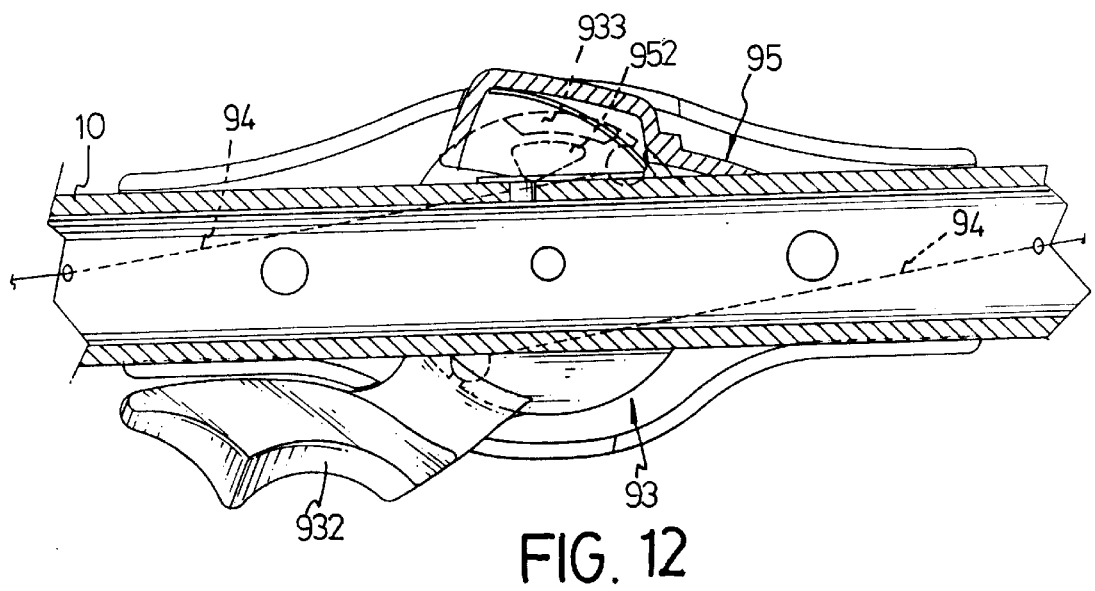
FIG. 12 is a schematic view of the switch showing how the steel wires provided on the disc are tracked to cause the detachment of the foldable mechanism of the stroller as shown in FIGS. 2 and 3.

Referring to FIG. 12, the latch 95 is depressed by a user by which abutment between the stop 959 and the arcuate flange 939 is released and the lever 932 can pivot to a fully disengaged state as shown in FIG. 13. Therefore, if the latch 95 is fully depressed, the pair of cables 94 will link to the traction element 50 disposed on both sides of the stroller and thus the first step of folding process of the stroller is completed.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A foldable mechanism for use in a stroller comprising:

a pair of supporting rods each having a long slot and a first bore defined therein;

an adjusting rod movably received within said long slot of each of said supporting rods;

a handle having a second bore and a through hole defined therein;

a pair of connecting members each mounted onto said handle and having a first hole and a second hole defined therein; said connecting member securely connected with said supporting rod through a first pin inserted into said second hole thereof and said first bore of said supporting rod;

a pair of retainers each having a notch defined on a front bottom side thereof, a third hole defined in a central portion thereof, a catch integrally formed on a side face thereof and a hole defined on a rear portion thereof and securely connected with said connecting member through a second pin inserted into said first hole of said connecting member and said third hole thereof;

a transverse bar having two distal ends each securely inserted into said hole in the rear portion of one of said retainers;

a traction element fixedly connected to a front portion of said retainer;

a resilient member having a first end securely connected with said adjusting rod and a second end securely connected with said catch of said retainer; and a pair of link members each having a fourth hole and a protrusion integrally formed on one of said plate, said protrusion configured and sized to fit within said notch of said retainer; said link member pivotally connected with a middle support and said handle through said fourth hole of each of said plate and said through hole of said handle.

2. The foldable mechanism for use in a stroller as claimed in claim 1, wherein said traction element extends through said second bore of said handle and said sleeve.

3. The foldable mechanism for use in a stroller as claimed in claim 1 further comprising a safety catch pivotally connected onto said middle support and having a recess aligned with said notch of said retainer and a side wing integrally formed therewith.

* * * * *